United States Patent
Mizumoto et al.

(10) Patent No.: US 8,482,878 B2
(45) Date of Patent: Jul. 9, 2013

(54) REDUCING PARTICLES ADHERING TO A HARD DISK

(75) Inventors: Naoshi Mizumoto, Kanagawa (JP);
Takashi Kouno, Ibaraki-ken (JP);
Masaki Ootsuka, Kanagawa (JP);
Takaaki Deguchi, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 226 days.

(21) Appl. No.: 12/980,192

(22) Filed: Dec. 28, 2010

(65) Prior Publication Data

US 2012/0162817 A1 Jun. 28, 2012

(51) Int. Cl.
*G11B 33/14* (2006.01)

(52) U.S. Cl.
USPC .......................................... 360/97.15

(58) Field of Classification Search
USPC .................... 360/97.12, 97.13–97.15
See application file for complete search history.

(56) References Cited

U.S. PATENT DOCUMENTS

| | | | |
|---|---|---|---|
| 6,788,493 B1 | 9/2004 | Subramaniam et al. | |
| 6,987,640 B2 | 1/2006 | Tsang et al. | |
| 7,289,294 B2 | 10/2007 | Lee et al. | |
| 7,405,904 B2 | 7/2008 | Chan et al. | |
| 7,508,623 B2 * | 3/2009 | Gross | 360/97.14 |
| 7,554,762 B2 * | 6/2009 | Suwa et al. | 360/97.14 |
| 8,274,754 B2 * | 9/2012 | Chan et al. | 360/97.13 |
| 2003/0156350 A1 * | 8/2003 | Hong et al. | 360/97.02 |
| 2007/0002490 A1 * | 1/2007 | Suwa et al. | 360/97.02 |
| 2007/0188914 A1 * | 8/2007 | Gross | 360/97.02 |
| 2009/0034125 A1 | 2/2009 | Chan et al. | |
| 2009/0091857 A1 | 4/2009 | Chan et al. | |
| 2009/0279203 A1 * | 11/2009 | Chan et al. | 360/97.01 |

FOREIGN PATENT DOCUMENTS

| | | | |
|---|---|---|---|
| JP | 62188088 A | * | 8/1987 |
| JP | 62298075 A | * | 12/1987 |
| JP | 63094495 | | 4/1988 |
| JP | 63094495 A | * | 4/1988 |
| JP | 63106975 A | * | 5/1988 |
| JP | 01248370 | | 3/1989 |
| JP | 01192075 A | * | 8/1989 |
| JP | 04098671 A | * | 3/1992 |
| JP | 04123377 A | * | 4/1992 |
| JP | 2007323788 | | 12/2007 |
| JP | 2009104750 A | * | 5/2009 |
| JP | 2010040084 A | * | 2/2010 |
| JP | 2010140573 A | * | 6/2010 |

OTHER PUBLICATIONS

Zhang, QI DE "Mitigation of flow induced vibration of head gimbal assembly", http://www.springerlink.com/content/utg0642514465x45/, (Mar. 31, 2009),1-7 pages.

(Continued)

*Primary Examiner* — Will J Klimowicz

(57) ABSTRACT

A spoiler of a hard disk drive including a body portion coupled with a housing of the hard disk drive and adjacent to a hard disk, and an end portion coupled with the body portion, the end portion comprising a fan-shape, the spoiler extending radially with respect to the hard disk and parallel to a surface of the hard disk, wherein the fan-shape expands outward toward the tip end.

10 Claims, 5 Drawing Sheets

OTHER PUBLICATIONS

Takada, Shigenori et al., "experimental study on flow-induced disk flutter dynamics by measuring the pressure between disks", http://scitation.aip.org/getabs/servlet/getabsservlet?prog=normal&id=jfega4000129000003000368000001&idtype=cvips&gifs=yes&ref=no, (Mar. 2007),1 page.

Ali, S et al., "Computational Models for Predicting Airflow Induced Particle Contamination in Hard Disk Drive Enclosures", http://pdf.aiaa.org/preview/CDReadyMCFD05_1159/PV2005_5342.pdf, (Jun. 6-Sep. 2005),1 page.

* cited by examiner

REDUCING PARTICLES ADHERING TO A HARD DISK

TECHNICAL FIELD

The present invention relates to the field of hard disk drives, and more particularly to an apparatus and method for reducing particles in a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

A second refinement to the hard disk drive is the increased efficiency and reduced size of the spindle motor spinning the disk. That is, as technology has reduced motor size and power draw for small motors, the mechanical portion of the hard disk drive can be reduced and additional revolutions per minute (RPMs) can be achieved. For example, it is not uncommon for a hard disk drive to reach speeds of 15,000 RPMs. This second refinement provides weight and size reductions to the hard disk drive, it also provides a faster read and write rate for the disk thereby providing increased speed for accessing data. The increase in data acquisition speed due to the increased RPMs of the disk drive and the more efficient read/write head portion provide modern computers with hard disk speed and storage capabilities that are continually increasing.

However, the higher RPMs of the disk has resulted in problems with respect to the interaction of the air with components of the hard disk drive. For example, although the hard disk drive is closed off from the outside, it has an amount of air within its packaging. As the disk spins and the RPMs increase, the air within the hard disk drive package will also begin to rotate and will eventually approach the speed at which the disk is rotating especially near the spindle hub and disk surfaces. This is due to the friction between the disk and the air. In general, Reynolds numbers are used to represent the flow characteristics. For example, in one case the Reynolds number may be based on the tip speed of the disk. That is, the linear velocity at the outer diameter of the disk.

Only when the Reynolds number is sufficiently small (e.g., an enclosure with reduced air density), the air may stay in laminar flow with the boundary layer of air remaining smooth with respect to the rotating disk. However, any obstructions to the flow will result in turbulence. That is, due to the introduction of obstructions to the airflow, the airflow will become turbulent as it passes the obstruction.

As is well known from fluid mechanics, the characteristics of turbulent airflow can include buffeting, harmonic vibration, and the like. Each of these characteristics will result in problematic motion for the arm and head portion and/or the rotating disk. The problematic motion will result in excessive track misregistration. This is even more significant as the tolerances are further reduced.

A second problem also occurs due to the increasingly tighter tolerances of the hard disk drive. For example, particle matter in the air can be detrimental to the operation of the hard disk drive. That is, since the head portion of the hard disk drive is located so close to the disk, even the slightest particle in the air can cause the head portion to destructively interact with the track it is reading from or writing to. Furthermore, particles can accumulate on disk drive components, reducing performance and potentially damaging the disk drive.

DESCRIPTION OF EMBODIMENTS

Figure 1:
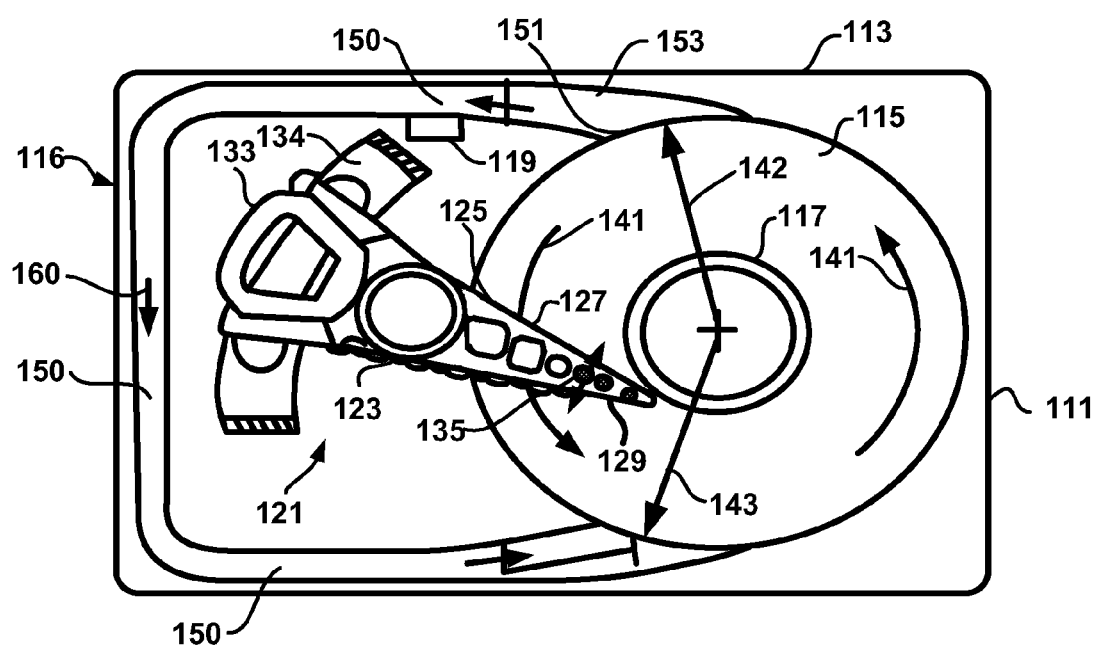
FIG. 1 is a schematic, top plan view of a hard disk drive in accordance with one embodiment of the present technology.

Reference will now be made in detail to the alternative embodiment(s) of the present invention, an apparatus and method for reducing particles adhering to a hard disk. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Overview

Devices employing various forms of disks such as optical disks, magneto-optical disks, and floppy hard disks are known in the art as disk drives constituting examples of rotating disk-type storage devices, and among these, hard disk drives (HDDs) are in widespread use as data recording devices such as personal computers and servers. HDDs are not limited to computing, and they are sued in a wide range of applications including video image recording/reproduction devices and car navigation systems.

When the hard disk rotates, the surface airflow forms an air bearing which imparts a floating force at the air bearing surface of the slider so that the slider is held slightly above the hard disk surface. The drive force of the voice coil motor makes it possible for the slider to pivot about the pivot shaft in substantially the radial direction of the hard disk while the slider is floating slightly above the hard disk surface, whereby the hard head can read/write data at specific positions on the disk surface. (It should be noted that the terms, "upstream side" and "downstream side" are used to indicate the directional position of the relevant component in relation to the air flowing in the direction of rotation produced by the rotation of the hard disk.)

In hard disk devices of this kind, there is a need for improved positioning accuracy of the head as the magnetic recording density on the hard disk increases. The hard disks which are used in HDDs have a plurality of data tracks which comprises one or more data sectors. Furthermore, the hard disks have a plurality of servo tracks which comprise a plurality of servo sectors that are separated in the circumferential direction. Data sectors are recorded between the servo sectors. The swinging actuator moves a head slider over the rotating hard disk. The head slider is able to write data to the data sectors and to read data from the data sectors by accessing the required data sector according to position data indicated by the servo sectors.

The head slider floats above the rotating hard disk and the actuator positions the head slider in the required radial position above the hard disk. For data reading, signals which are read from the hard disk by the head slider are subjected to specific processing, such as waveform shaping or decryption processing, by means of a signal processing circuit, and these signals are then sent to a host. Data transferred from the host is subjected to specific processing by means of the signal processing circuit, after which it is written to the hard disk.

There are various ways for positioning the head more accurately in HDDs. These ways are problematic in terms of the airflow which is produced by the rotation of the hard disk. For example, the airflow causes the actuator suspension to vibrate, which prevents the correct positioning of the head slider. A further problem is disk flutter, which is caused by turbulence in the airflow generated by the rotation of the hard disk. Disk flutter prevents the correct positioning of the head with respect to the tracks, in the same way as shaking of the head itself. This kind of vibration caused by the airflow is referred to as flow induced vibration (FIV).

Thus, conventional air spoilers which are provided in hard disk devices reduce the airflow produced inside the hard disk device as the hard disk rotates so as to suppress vibration of the disk head caused by airflow turbulence. Further, conventional air spoilers reduce the amount of dust which flows to the downstream side of the spoiler and reduces the amount of dust which adheres to the disk. However, further improvements are needed in order to reduce the amount of dust adhering to the disk on the scale of mass production.

Filters or similar apparatuses are disposed inside the hard disk device in order to deal with dust adhering to the disk. However, there is not effective means for directly controlling this dust.

Embodiments of the present technology enable the effective control of air turbulence vibration caused by the rotation of the disk by endowing the fin of the air spoiler provided in the hard disk device with an expanded blade shape. Further, embodiment of the present technology reduce the amount of dust adhering to the disk by reducing the amount of dust which flows to the downstream side of the air spoiler. Additionally, embodiments of the present technology provide a magnetic storage device which achieve very accurate positioning by making full use of the air spoiler capabilities.

Embodiments provide for the fin of the air spoiler in the hard disk device to be shaped like a fan blade, which expands outward towards its tip end. The fin is shaped like a blade which is inclined more to the upstream side of the disk than the line joining the center of the disk and the end of the disk so that the amount of dust adhering to the disk can be restricted.

In one embodiment, the side 304 (of FIGS. 3A and 3B, discussed below) joining the upstream side of the fin and the radial direction facing side of the fin is angled so as to cut into the downstream side so that the amount of dust adhering to the disk can be further reduced. Thus, the arm flutter component can be reduced and the positioning accuracy may be improved.

In one embodiment, when the fin has a blade shape which is inclined more to the carriage side than the line joining the center of the disk and the end of the disk, the amount of dust adhering to the disk on the downstream side of the actuator can be effectively restricted.

Embodiments of the present technology enable the reduction of FIV, dust adhering to the disk, and scratching of the disk during the mass production process, and the ability to position the head with greater accuracy.

The discussion below will begin with an overview of a hard disk drive and components connected therewith. The discussion will then focus on embodiments of the apparatus.

Hard Disk Drive

With reference now to FIG. 1, a schematic drawing of one embodiment of an information storage system 100 comprising a hard disk file or hard disk drive 111 for a computer system is shown. Hard disk drive 111 has an outer housing or base 113 containing a disk pack having at least one media or hard disk 115. The hard disk or hard disks 115 are rotated (see arrows 141) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to hard disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to hard disk 115. The level of integration called the head gimbal assembly (HGA) is head and the slider 129, which are mounted on suspension 127. The slider 129 is usually bonded to the end of suspension 127. The head is typically pico size (approximately 1160×1000×300 microns) and formed from ceramic or intermetallic materials. The head also may be of "femto" size (approximately 850×700×230 microns) and is preloaded against the surface of hard disk 115 (in the range two to ten grams) by suspension 127.

Suspensions 127 have a spring-like quality, which biases or urges the air-bearing surface of the slider 129 against the hard disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the hard disk 115 until the heads settle on their respective target tracks. The head gimbal assemblies operate in a conventional manner and always move in unison with one another, unless hard disk drive 111 uses multiple independent actuators (not shown) wherein the arms can move independently of one another.

Referring still to FIG. 1, the hard disk pack and hard disks 115 (one shown) define an axis 140 of rotation 141 and radial directions 142, 143, relative to the axis 140. The drive 111 also has a bypass channel 150 formed in the housing 113 for directing the airflow 160 generated by rotation of the hard disks 115 from the upstream side of the disk pack or hard disks (e.g., proximate to radial direction 142 in FIG. 1) 115 to the downstream side of the hard disk pack or hard disks 115 (e.g., proximate to radial direction 143 in FIG. 1).

Example Apparatus

Figure 2:
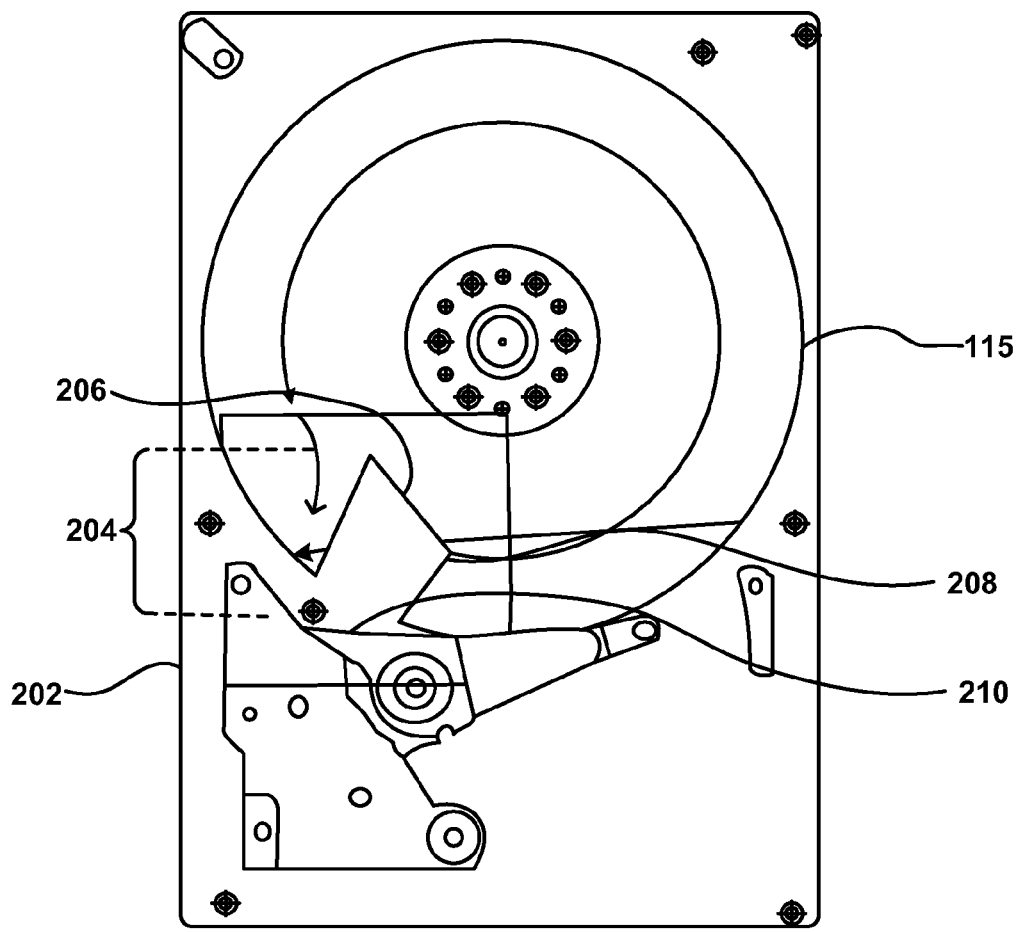
FIG. 2 is a diagram of an example spoiler in accordance with one embodiment of the present technology.

Embodiments of the present technology include a spoiler 204 having a body portion 210, an end portion 208 coupled with the body portion 210, wherein the end portion 208 includes a fan-shape that expands outward toward the tip end 206 of a hard disk drive 111 (shown in FIG. 2 as "200"). In one embodiment, the upstream facing side 302 of the spoiler 204 is inclined more to an upstream side of the rotating disk than a line joining a center of the disk and an end of the disk. In another embodiment, the joining side 304 inclines at an angle so as to cut into the downstream side of the disk, wherein the joining side 304 joins the upstream facing side 302 and a radial direction facing side 306 of the spoiler 204. In yet another embodiment, the radial direction facing side 306 is inclined more to the carriage 308 side of the hard disk drive 200 than the line joining the center of the rotating disk and the end of the rotating disk. Embodiments of present technology reduce the amount of dust adhering to the disk.

Figure 3A:
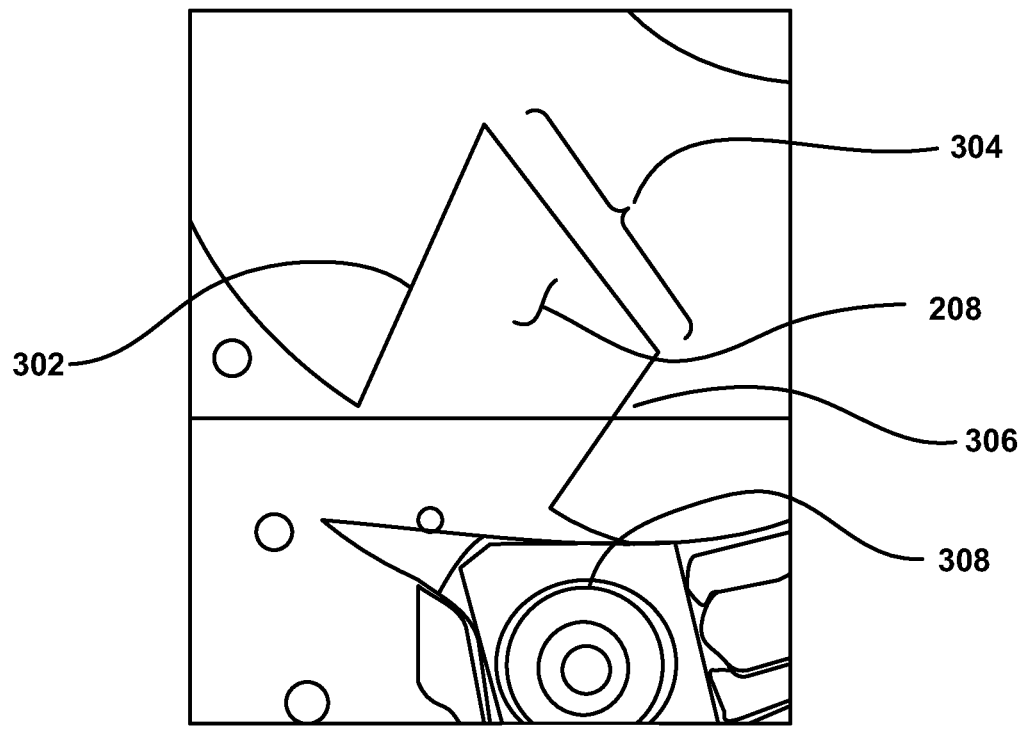
FIG. 3A is a diagram of an enlarged example spoiler of FIG. 2 in accordance with one embodiment of the present technology.

FIG. 2 is a diagram of an example spoiler 204 in accordance with one embodiment of the present technology. FIG. 3A is a diagram of an enlarged example spoiler 204 in accordance with one embodiment of the present technology. Referring now to FIGS. 1-3A, in one embodiment, the spoiler 204 of a hard disk drive 200 includes a body portion 210 coupled with the housing of the hard disk drive 200 and is adjacent to the hard disk 115. Further, in one embodiment, the spoiler 204 includes an end portion 208 that is coupled with the body portion 210. The end portion 208 is of a fan-shape that expands outward toward a tip end 206 of the end portion 208. The spoiler 204 extends radially with respect to the hard disk 115 and is parallel to a surface of the hard disk 115.

In one embodiment, the expansion outward toward the tip end 206 is gradual. In another embodiment, the expansion outward toward the tip end 206 is abrupt.

In one embodiment the spoiler 204 includes an upstream facing side 302 including an inclination that inclines more to the upstream side of the hard disk 115 than a line joining a center of the hard disk 115 and an end of the hard disk 115 such that an amount of particles adhering to the hard disk 115 is reduced. In addition to the inclined upstream side, in one embodiment, the spoiler 204 includes a joining side 304 including an inclination that is angled so as to cut into a downstream side of the hard disk 115, the joining side 304 joining the upstream facing side 302 and a radial direction facing side 306 of the spoiler 204, such that the amount of particles adhering to the hard disk 115 is further reduced. Furthermore, in addition to the inclined upstream side and the joining side 304 being of an inclination, in one embodiment, radial direction facing side 306 is inclined more to a carriage 308 side of the hard disk drive 200 than the line joining the center of the hard disk 115 and the end of the hard disk 115, such that the amount of particles adhering to the hard disk 115 on the downstream side of the hard disk 115 is further reduced.

Figure 3B:
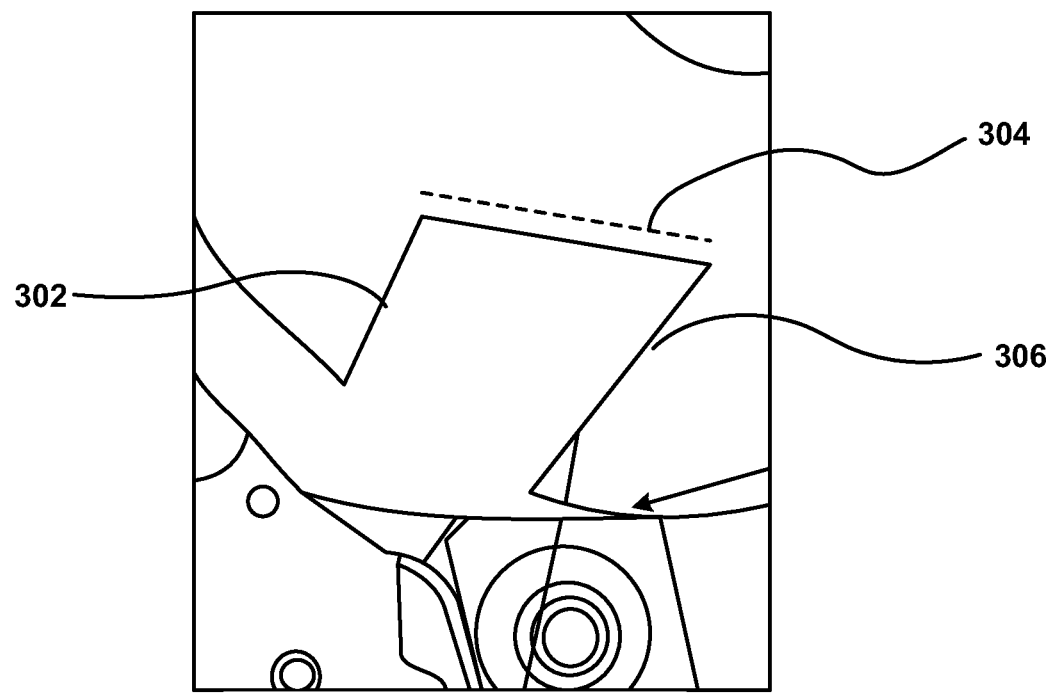
FIG. 3B is a diagram of an enlarged example spoiler having a joining side at a reverse angle as that shown in FIG. 2 in accordance with one embodiment of the present technology.

Referring now to FIG. 3B, a diagram of an enlarged example spoiler 204 having a joining side 304 at a reverse angle of that spoiler shown in FIG. 2 in accordance with one embodiment of the present technology. In one embodiment, the radial direction facing side 306 is greater in length than the upstream facing side 302. The joining side 304 includes an inclination that joins the upstream facing side 302 and a radial direction facing side 306 of the spoiler 204.

In another embodiment, the radial direction facing side 306 is of such a length such that at least one quarter of the radius of the hard disk 115 is left. In other words, the spoiler 204 reaches over the hard disk 115 such that at least one quarter of the radius of the hard disk 115 remains uncovered by the spoiler 204.

In one embodiment, the upstream facing side 302 and the radial direction facing side 306 are of the same length. Given this, in one embodiment, the joining side 304 is of a curved shape that has a same arc as a curvature of the arc of the hard disk 115. In another embodiment, the joining side 304 is straight. In yet another embodiment, the joining side 304 includes a curved shape that has an outward arc. The shapes formed by the joining side 304 being straight or of a curved shape, either with a curvature of the arc being that of the hard disk 115 or being an outward arc, are considered to be of an overhang shape.

In one embodiment, the spoiler 204 is part of a hard disk drive with a disk pack mounted to the housing and having a plurality of disks that are rotatable relative to the housing. The disk pack defines an axis of rotation and a radial direction relative to the axis. Further, an actuator is mounted to the housing and is movable relative to the disk pack. The actuator has a plurality of heads for reading data from and writing data to the plurality of disks. In one embodiment, at least one of these spoilers includes the body portion 210 and the end portion 208 described herein.

Figure 4:
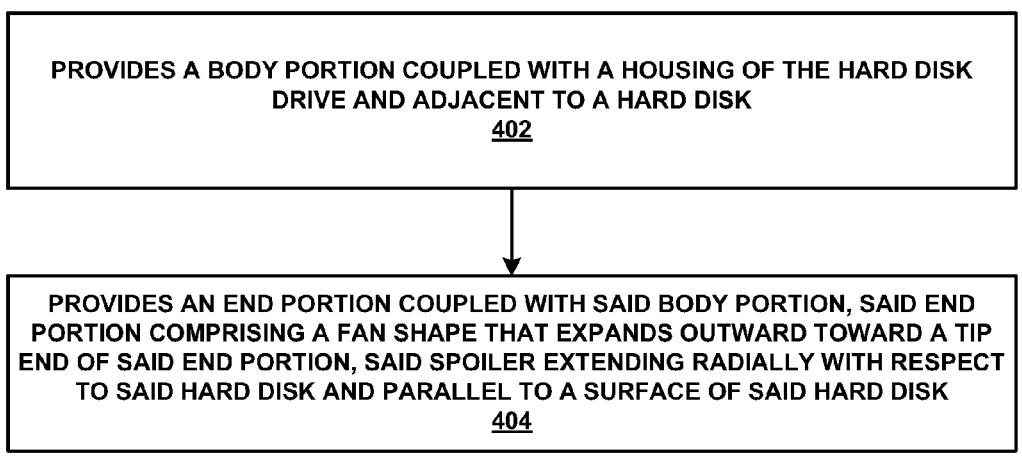
FIG. 4 is a flow diagram of an example method for reducing particles adhering to a hard disk in accordance with one embodiment of the present technology.

FIG. 4 shows a flow diagram of an example method for reducing particles adhering to a hard disk 115 in accordance with one embodiment of the present technology. Referring now to FIGS. 1-4, at 402 and as described herein, a body portion 210 coupled with a housing of the hard disk drive 200 and adjacent to a hard disk 115 is provided.

Referring to FIGS. 1-4 and as described herein, at 404, an end portion 208 coupled with the body portion 210 is provided. The end portion 208 comprises a fan-shape that expands outward toward a tip end 206 of the end portion 208. The spoiler 204 extends radially with respect to the hard disk 115 and is parallel to a surface of the hard disk 115. The end portion 208 expands outward toward the tip end.

The alternative embodiment(s) of the present technology, a method and system for reducing particle adhering to a hard disk 115 in a hard disk drive 200, is thus described. While the present invention has been described in particular embodiments, it should be appreciated that the present invention should not be construed as limited by such embodiments, but rather construed according to the below claims.

What is claimed is:

1. A spoiler of a hard disk drive comprising:
   a body portion coupled with a housing of said hard disk drive and adjacent to a hard disk; and
   an end portion coupled with said body portion, said end portion comprising a fan-shape, said spoiler extending radially with respect to said hard disk and parallel to a surface of said hard disk, wherein said end portion comprises:
      an upstream facing side comprising an inclination end that is closer to a center of said hard disk than a radial direction facing side; and
   wherein said fan-shape expands outward toward said end portion.

2. The spoiler as described in claim 1 wherein said expansion outward toward said end portion is gradual.

3. The spoiler as described in claim 1 wherein said end portion comprises:
   said upstream facing side comprising an inclination that inclines more to an upstream side of said hard disk than a line joining a center of said hard disk and an end of said hard disk such that an amount of particles adhering to said hard disk is reduced.

4. The spoiler as described in claim 1, wherein said upstream facing side is greater in length than said radial direction facing side of said spoiler.

5. The spoiler as described in claim 1, wherein said radial direction facing side is of such a length such that at least one quarter of a radius of said hard disk is left.

6. A hard disk drive comprising:
   a housing;
   a hard disk pack mounted to the housing and having a plurality of hard disks that are rotatable relative to the housing, the hard disk pack defining an axis of rotation and a radial direction relative to the axis;
   an actuator mounted to the housing and being movable relative to the hard disk pack, the actuator having a plurality of heads for reading data from and writing data to the hard disks; and
   a plurality of spoilers, at least one spoiler comprising:
      a body portion coupled with said housing of said hard disk drive and
      adjacent to said hard disk; and
   an end portion coupled with said body portion, said end portion comprising a fan-shape, said spoiler extending radially with respect to said hard disk and parallel to a surface of said hard disk, wherein said end portion comprises:
      an upstream facing side comprising an inclination end that is closer to a center of said hard disk than a radial direction facing side, and wherein said fan-shape expands outward toward said end portion.

7. The hard disk drive as described in claim 6 wherein said end portion comprises:
   said upstream facing side comprising an inclination that inclines more to an upstream side of said hard disk than a line joining a center of said hard disk and an end of said hard disk such that an amount of particles adhering to said hard disk is reduced.

8. The hard disk drive as describe in claim 6, wherein said upstream facing side is greater in length than said radial direction facing side of said disk drive spoiler.

9. The hard disk drive as described in claim 6, wherein said radial direction facing side is of such a length such that at least one quarter of a radius of said hard disk is left.

10. A method for reducing particles adhering to a hard disk in a hard disk drive comprising:
    providing a spoiler comprising a body portion coupled with a housing of said hard disk drive and adjacent to a hard disk; and
    providing an end portion coupled with said body portion, said end portion comprising a fan-shape that expands outward toward a tip end of said end portion, said spoiler extending radially with respect to said hard disk and parallel to a surface of said hard disk, wherein said end portion comprises an upstream facing side comprising an inclination end that is closer to a center of said hard disk than a radial direction facing side.

* * * * *